US011114709B2

(12) United States Patent
Omura et al.

(10) Patent No.: US 11,114,709 B2
(45) Date of Patent: Sep. 7, 2021

(54) BATTERY MODULE

(71) Applicant: Panasonic Intellectual Property Management Co., Ltd., Osaka (JP)

(72) Inventors: Tetsuji Omura, Osaka (JP); Kazunari Hiraide, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 16/324,208

(22) PCT Filed: Sep. 12, 2017

(86) PCT No.: PCT/JP2017/032764
§ 371 (c)(1),
(2) Date: Feb. 8, 2019

(87) PCT Pub. No.: WO2018/061738
PCT Pub. Date: Apr. 5, 2018

(65) Prior Publication Data
US 2020/0044297 A1   Feb. 6, 2020

(30) Foreign Application Priority Data

Sep. 27, 2016 (JP) .............................. JP2016-188604

(51) Int. Cl.
| | | |
|---|---|---|
| *H01M 10/613* | (2014.01) | |
| *H01M 10/6551* | (2014.01) | |
| *H01M 10/6555* | (2014.01) | |
| *H01M 50/20* | (2021.01) | |
| *H01M 10/6565* | (2014.01) | |
| *H01M 10/6554* | (2014.01) | |

(52) U.S. Cl.
CPC ..... *H01M 10/613* (2015.04); *H01M 10/6551* (2015.04); *H01M 10/6554* (2015.04); *H01M 10/6555* (2015.04); *H01M 10/6565* (2015.04); *H01M 50/20* (2021.01)

(58) Field of Classification Search
CPC ........... H01M 10/613; H01M 10/6551; H01M 10/6556; H01M 10/6554
See application file for complete search history.

(56) References Cited

U.S. PATENT DOCUMENTS

| 2011/0151300 A1* | 6/2011 | Herrmann ......... H01M 10/0413 |
| | | 429/120 |
| 2011/0200862 A1 | 8/2011 | Kurosawa |
| 2016/0036102 A1 | 2/2016 | Suzuki et al. |

FOREIGN PATENT DOCUMENTS

| JP | 9-120847 | 5/1997 |
| JP | 2011-023296 | 2/2011 |
| JP | 2011-171029 | 9/2011 |
| WO | 2014/155609 | 10/2014 |

OTHER PUBLICATIONS

International Search Report of PCT application No. PCT/JP2017/032764 dated Nov. 14, 2017.

* cited by examiner

*Primary Examiner* — Ladan Mohaddes
(74) *Attorney, Agent, or Firm* — McDermott Will and Emery LLP

(57) ABSTRACT

A battery module includes a battery stack having a plurality of stacked batteries, a first heat radiator facing first surface of battery stack, a first heat transfer component that is in contact with the first heat radiator and first surface to transfer heat from the battery stack to the first heat radiator, and a second heat radiator facing a second surface of the battery stack. The second surface extends in a direction intersecting with the first surface. The second heat radiator is thermally connected to the second surface directly or through the second heat transfer component. A positional relationship between the first heat transfer component and the battery stack is formed such that the center of the first heat transfer component (84) is more away from the second heat radiator than the center of the battery stack is in a direction along the first surface.

16 Claims, 7 Drawing Sheets

BATTERY MODULE

CROSS-REFERENCE TO RELATED APPLICATIONS

This application is a U.S. national stage application of the PCT International Application No. PCT/JP2017/032764 filed on Sep. 12, 2017, which claims the benefit of foreign priority of Japanese patent application 2016-188604 filed on Sep. 27, 2016, the contents all of which are incorporated herein by reference.

TECHNICAL FIELD

The present invention relates to a battery module.

BACKGROUND ART

It is known that a battery module including a battery stack of a plurality of batteries connected in series serves as a power supply for vehicles or other uses that requires a high output voltage, for example. PTL 1 discloses such a battery module having a battery stack and a cooling plate in which a refrigerant flows. The battery module is configured to cool the battery stack because the cooling plate is put into contact with a surface of the battery stack.

CITATION LIST

Patent Literature

PTL 1: Unexamined Japanese Patent Publication No. 2011-171029

SUMMARY OF THE INVENTION

In the battery module described above, the cooling plate is in contact with one side of the battery stack. As a result, it is difficult to cool the battery stack uniformly. A possible method for uniformly cooling the battery stack is to have the cooling plate in contact with a plurality of surfaces of the battery stack. Unfortunately, this method results in upsizing of the battery module.

The present invention has been accomplished in light of this situation. It is an object of the present invention to provide a technique for cooling a battery stack of a battery module more uniformly while avoiding upsizing of the battery module.

A battery module is provided in accordance with an aspect of the present invention. The battery module includes a battery stack having a plurality of stacked batteries, a first heat radiator facing a first surface of the battery stack, a first heat transfer component that is in contact with the first heat radiator and the first surface to transfer heat from the battery stack to the first heat radiator, and a second heat radiator facing a second surface of the battery stack. The second surface extends in a direction intersecting with the first surface. The second heat radiator is thermally connected to the second surface directly or through a second heat transfer component. A positional relationship between the first heat transfer component and the battery stack is formed such that a center of the first heat transfer component is more away from the second heat radiator than a center of the battery stack is in a direction along the first surface.

The present invention provides a technique for cooling a battery stack of a battery module more uniformly while avoiding upsizing of the battery module.

DESCRIPTION OF EMBODIMENTS

Figure 1:
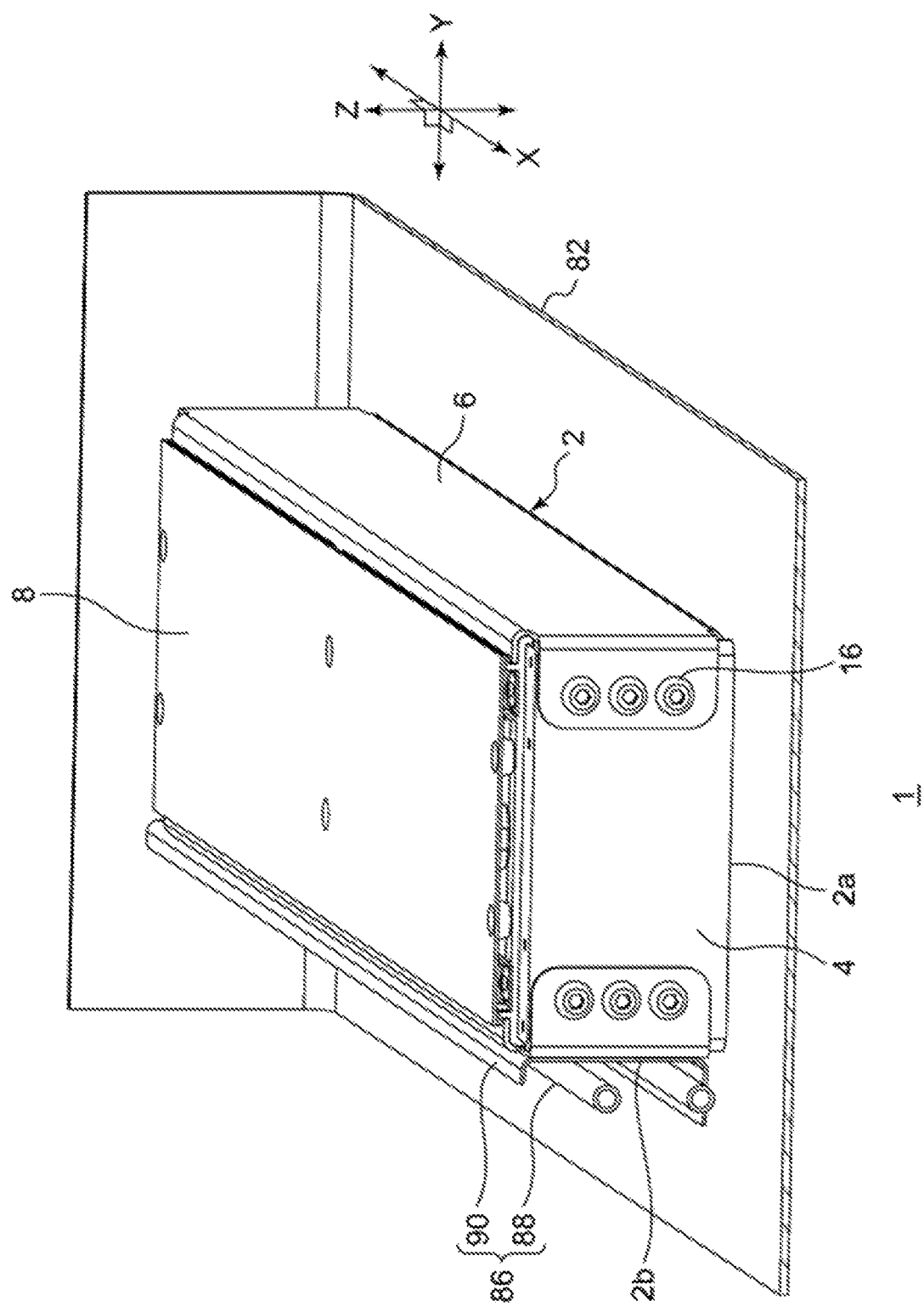
FIG. 1 is a schematic perspective view illustrating a structure of a battery module according to a first exemplary embodiment.

Hereinafter, the present invention will be described based on preferred exemplary embodiments with reference to the drawings. The exemplary embodiments are exemplifications and should not limit the invention. All the features described in the exemplary embodiments and a combination thereof are not necessarily essential to the invention. Identical reference marks are assigned to identical or equivalent components, members, processes illustrated in the drawings, and the overlap description thereof is omitted as appropriate. Further, scales or shapes of parts illustrated in the drawings are conveniently set to facilitate the description, and should not be interpreted restrictively unless otherwise mentioned. Even identical members may slightly differ from each other in scale or extent between the drawings. Additionally, the terms "first", "second", and the like used in the present description and claims should not represent any order or importance, but are intended to distinguish between one configuration and another configuration.

First Exemplary Embodiment

A battery module according to the present exemplary embodiment is summarized as below. A battery module according to the present exemplary embodiment includes a battery stack, a first heat radiator facing a first surface of the battery stack, a first heat transfer component that is in contact with the first heat radiator and the first surface to transfer heat from the battery stack to the first heat radiator, and a second heat radiator facing a second surface of the battery stack. The second surface extends in a direction intersecting with the first surface. The second heat radiator is thermally connected to the second surface directly or through a second heat transfer component. A positional relationship between the first heat transfer component and the battery stack is formed such that a center of the first heat transfer component is more away from the second heat radiator than a center of the battery stack is in a direction along the first surface. In the present exemplary embodiment, the first heat radiator is a seat on which the battery stack is placed, whereas the second heat radiator is a cooling unit having a cooling mechanism to cool the battery stack.

Figure 2:
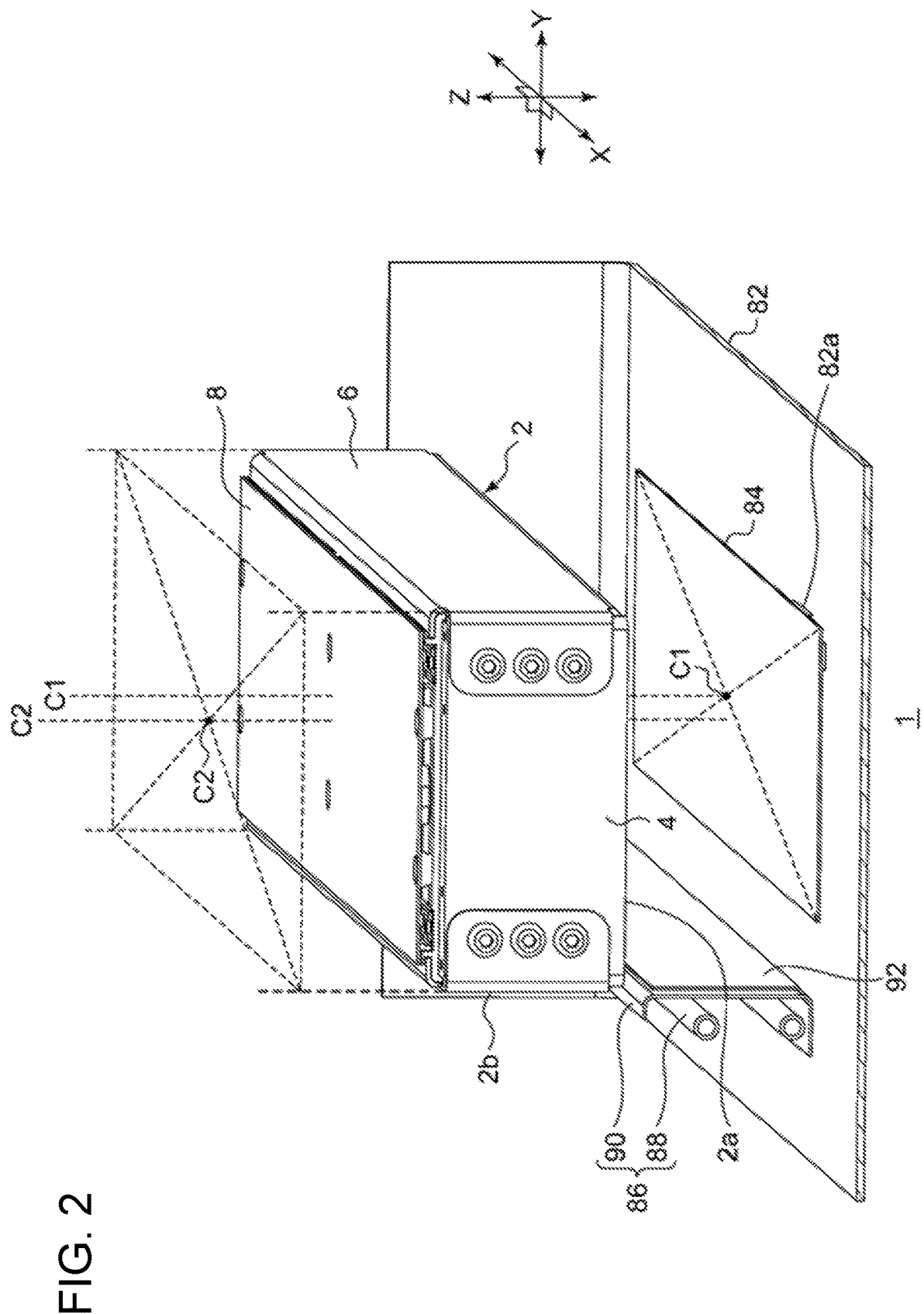
FIG. 2 is an exploded perspective view schematically illustrating the structure of the battery module according to the first exemplary embodiment.

FIG. 1 is a schematic perspective view illustrating a structure of a battery module according to the first exemplary embodiment. FIG. 2 is an exploded perspective view schematically illustrating the structure of the battery module according to the first exemplary embodiment. FIGS. 1 and 2 omit illustrations of openings 6d of restraint members 6. Seat 82 and cooling unit 86 are only partly shown.

Battery module 1 includes battery stack 2, covering 8, seat 82 acting as a first heat radiator, first heat transfer component 84, and cooling unit 86 acting as a second heat radiator.

Figure 3:
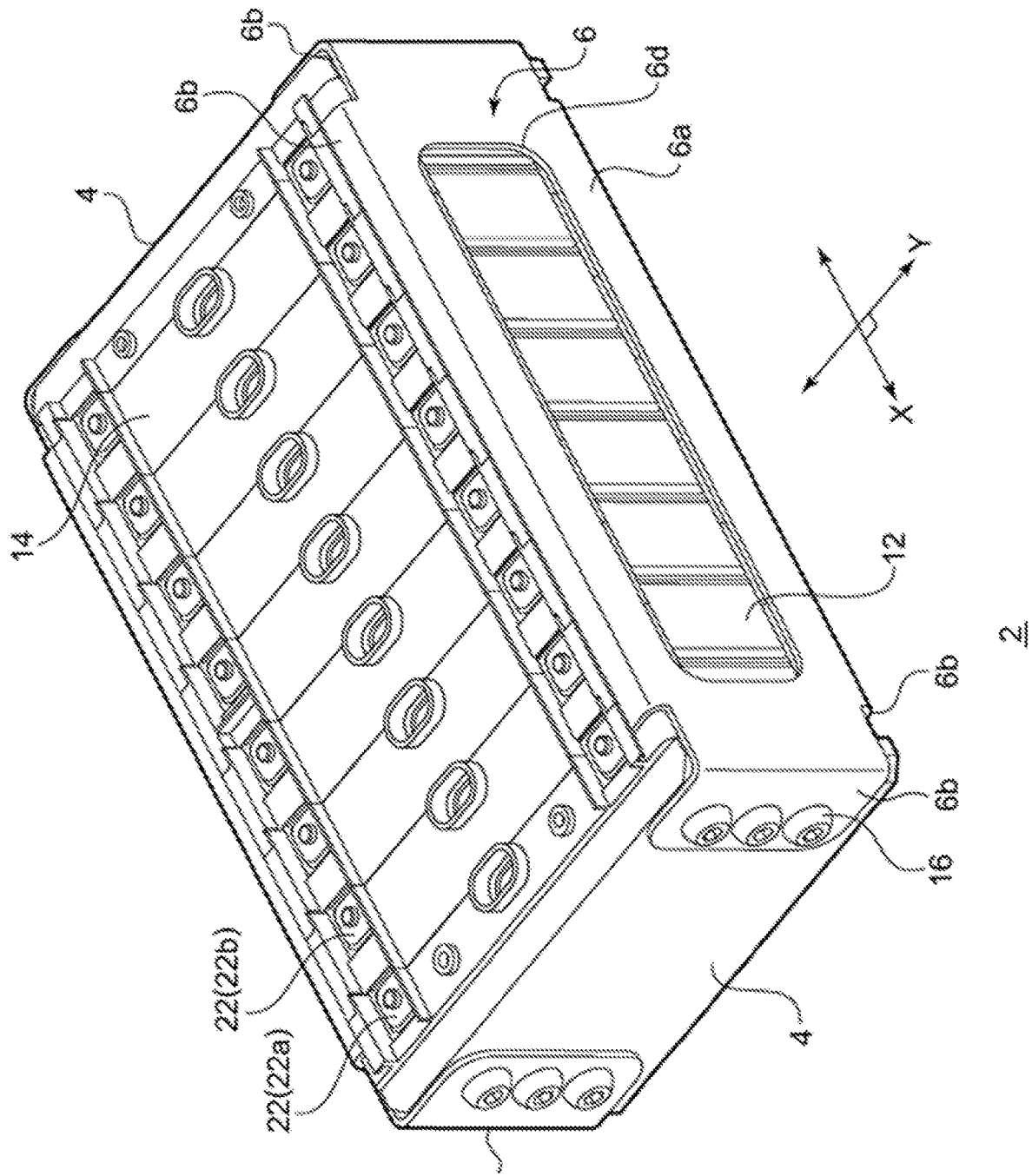
FIG. 3 is a schematic perspective view illustrating a structure of a battery stack incorporated in the battery module.

Battery stack 2 has a structure in which a plurality of batteries is stacked. FIG. 3 is a schematic perspective view illustrating a structure of a battery stack incorporated in the battery module. Battery stack 2 includes a plurality of batteries 12, a plurality of separators 14, a pair of end plates 4, and a pair of restraint members 6. In the present exemplary embodiment, for example, eight batteries 12 are connected in series by bus bars (not shown), whereby battery stack 2 is formed.

For example, each battery 12 is a rechargeable secondary battery, such as a lithium ion battery, a nickel-hydrogen battery, or a nickel-cadmium battery. Battery 12 is a so-called prismatic battery. The plurality of batteries 12 is stacked at predetermined intervals such that main surfaces of adjacent batteries 12 face each other. The "stack" herein denotes that a plurality of components is arranged in any one direction. Thus, the scope of "stacked batteries 12" includes cases in which the plurality of batteries 12 is arranged in a horizontal direction.

Figure 4:
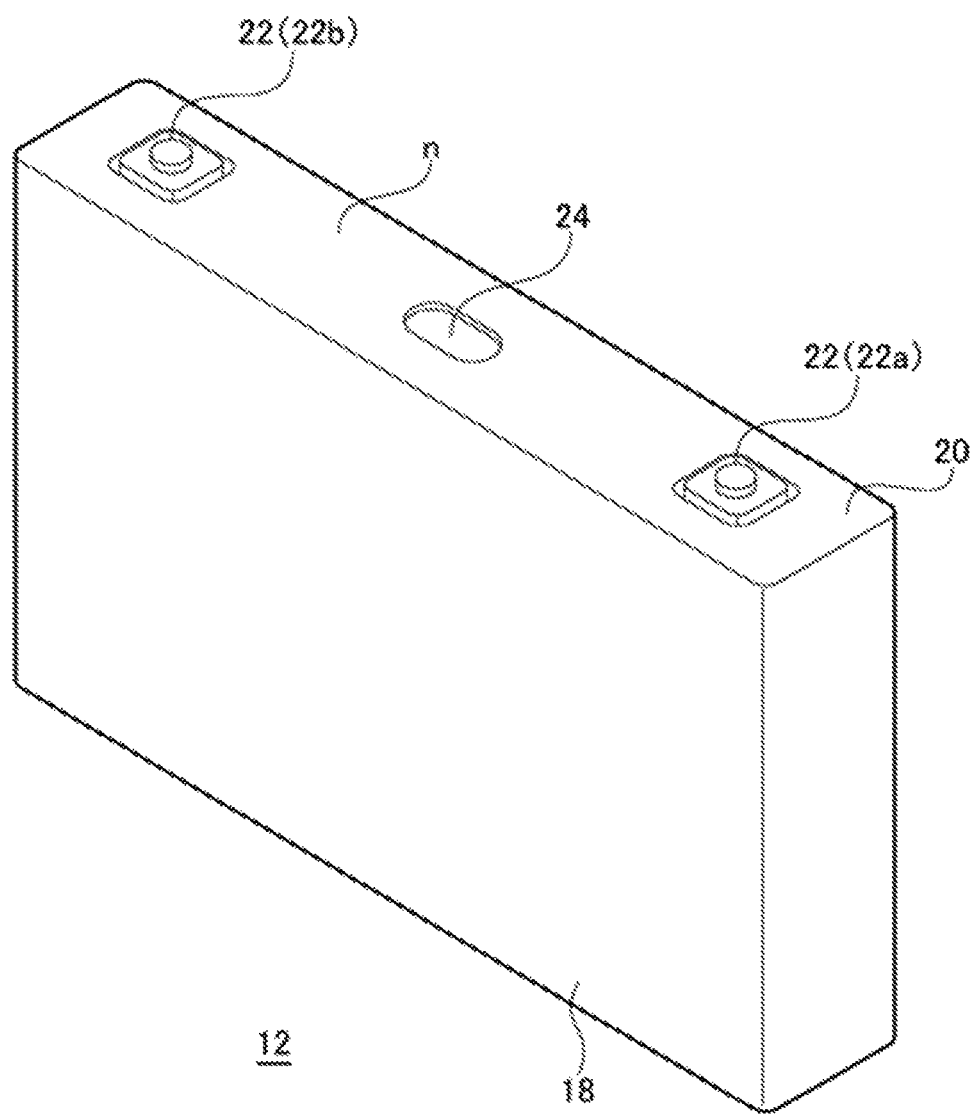
FIG. 4 is a schematic perspective view illustrating a structure of a battery.

FIG. 4 is a schematic perspective view illustrating a structure of battery 12. Battery 12 has exterior can 18 with a flat rectangular parallelepiped shape. A substantially rectangular opening is provided on one surface of exterior can 18, and exterior can 18 stores an electrode assembly, an electrolyte, and the like inserted through this opening. The opening of exterior can 18 is provided with sealing plate 20 to block the opening and seal an inside of exterior can 18. Sealing plate 20 has positive-electrode output terminal 22 (positive electrode terminal 22a) near one end in a longitudinal direction and negative-electrode output terminal 22 (negative electrode terminal 22b) near the other end in the longitudinal direction. Hereinbelow, when there is no need to distinguish polarities of the output terminal, positive electrode terminal 22a and negative electrode terminal 22b are collectively referred to as output terminal 22.

Sealing plate 20 and output terminals 22 constitute a sealing body. Exterior can 18 and sealing plate 20 are each formed from a metal. Typically, exterior can 18 and sealing plate 20 are each formed from a metal such as aluminum or an aluminum alloy. Output terminal 22 is formed from a metal having electrical conductivity.

In the present exemplary embodiment, a side provided with the sealing body serves as top surface n of battery 12, and an opposite side serves as a bottom surface of battery 12. Further, battery 12 has two main surfaces connecting top surface n and the bottom surface. This main surface is a surface having a largest area among six surfaces of battery 12. Remaining two surfaces excluding top surface n, the bottom surface, and the two main surfaces serve as side surfaces of battery 12. A side of batteries 12 closer to top surfaces n serves as a top surface of battery stack 2, and a side of batteries 12 closer to the bottom surfaces serves as a bottom surface of battery stack 2. A surface connecting the top surface and the bottom surface of battery stack 2 serves as a side surface of battery stack 2. Battery stack 2 is substantially rectangular and has four side surfaces.

Battery 12 has valve 24 on a surface to release gas produced inside battery 12. In the present exemplary embodiment, battery 12 has valve 24 on top surface n facing covering 8. In sealing plate 20, valve 24 is disposed between a pair of output terminals 22. Specifically, valve 24 is disposed substantially at a center of sealing plate 20 in the longitudinal direction. Valve 24 can be opened to release internal gas when internal pressure of exterior can 18 rises to a predetermined value or more. Valve 24 is also called a safety valve or a vent.

As shown in FIG. 3, the plurality of batteries 12 is disposed such that the main surfaces of adjacent batteries 12 face each other and output terminals 22 face in an identical direction (for convenience herein, upward in a vertical direction). Two adjacent batteries 12 are arrayed such that positive electrode terminal 22a of one of the batteries is adjacent to negative electrode terminal 22b of the other battery. Positive electrode terminal 22a and negative electrode terminal 22b that are adjacent to each other are electrically connected in series via a bus bar. The bus bar is a strip-shaped metal plate, for example. One end of the bus bar is electrically connected to positive electrode terminal 22a of one battery 12, and another end of the bus bar is electrically connected to negative electrode terminal 22b of other battery 12. Two adjacent batteries 12 may be arrayed such that positive electrode terminal 22a of one of the batteries is adjacent to positive electrode terminal 22a of the other battery. For example, if two adjacent batteries 12 are in parallel connection, batteries 12 are arrayed such that output terminals 22 of an identical polarity are adjacent to each other.

Separator 14 is also called an insulating spacer and is formed of resin having an insulation property, for example. Separator 14 is disposed between two adjacent batteries 12 so as to electrically insulate two adjacent batteries 12. Furthermore, separator 14 is disposed between battery 12 and end plate 4 so as to electrically insulate battery 12 and end plate 4. Examples of the resin forming separator 14 include thermoplastic resins such as polypropylene (PP) and polybutylene terephthalate (PBT).

Figure 5:
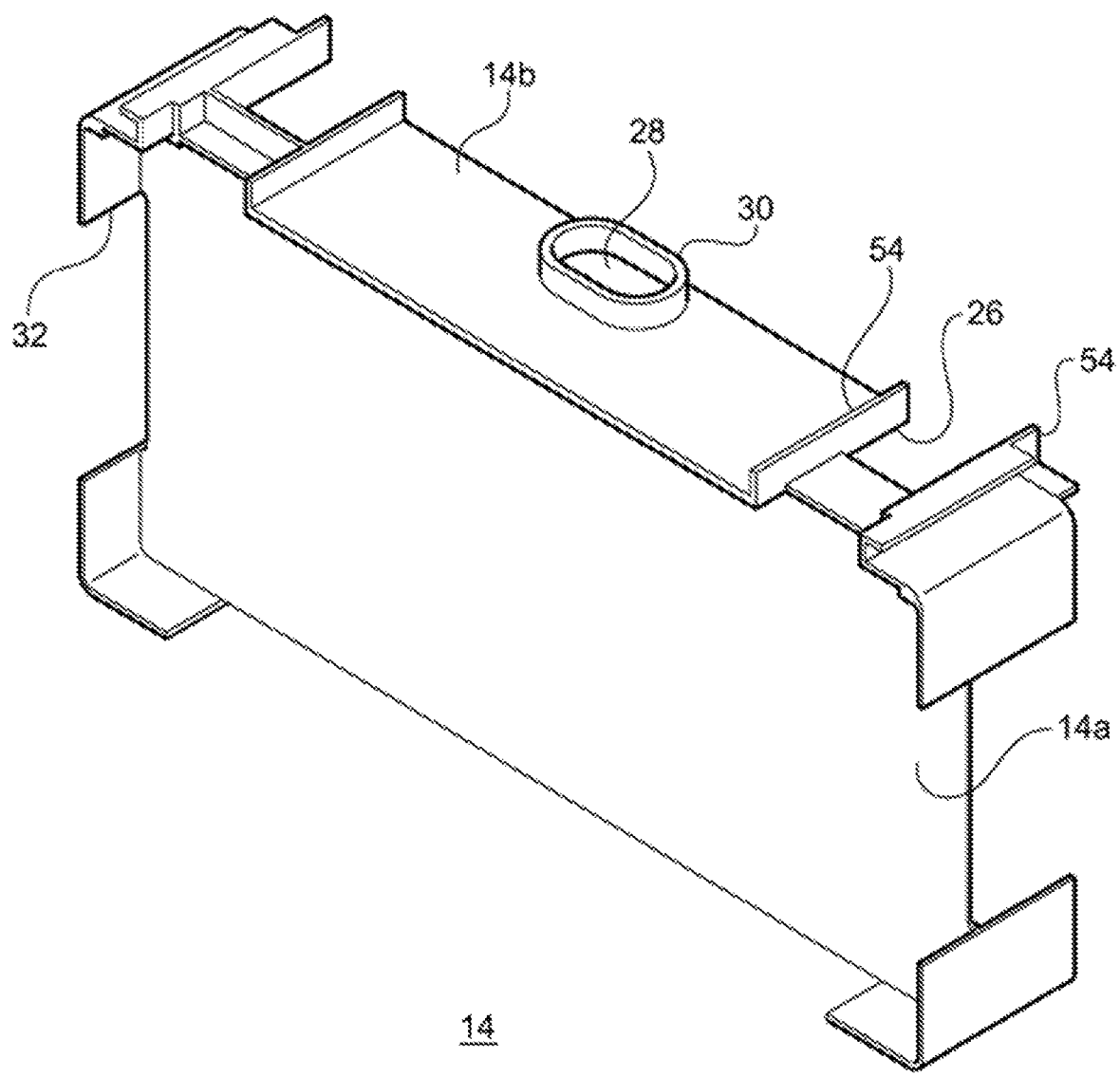
FIG. 5 is a schematic perspective view illustrating a structure of a separator.

FIG. 5 is a schematic perspective view illustrating a structure of separator 14. Separator 14 has plane 14a parallel to the main surface of battery 12, and wall 14b extending from an edge of plane 14a in stacking direction X of batteries 12 (a direction shown with arrow X in FIG. 3). Plane 14a extends along the opposing main surfaces of two adjacent batteries 12. Since plane 14a extends between the main surfaces of adjacent batteries 12, exterior cans 18 of adjacent batteries 12 are insulated from each other. Further, since plane 14a extends between battery 12 and end plate 4, exterior can 18 of battery 12 and end plate 4 are insulated from each other.

Top surface n, the bottom surface, and the side surfaces of battery 12 are covered with wall 14b. This can suppress a short circuit between adjacent batteries 12 or between battery 12 and end plate 4, which can be caused by, for example, dew condensation on a surface of battery 12 or end plate 4. In other words, a creepage distance between adjacent batteries 12 or between battery 12 and end plate 4 can be secured by wall 14b. In particular, wall 14b covers top surface n of battery 12, whereby the above-described short circuit can be further suppressed. In the present exemplary embodiment, a tip of wall 14b of one of two adjacent separators 14 abuts on a tip of wall 14b of the other separator. Therefore, battery 12 is housed in a space formed by plane 14a and wall 14b. In the present exemplary embodiment, separator 14 holds battery 12 by way of wall 14b.

Wall 14b has cutout 26 at a position corresponding to output terminal 22 to expose output terminal 22 to the outside. Wall 14b also has opening 28 at a position corresponding to valve 24 to expose valve 24 to the outside. An edge of opening 28 is provided with barrier 30 projecting from a surface of wall 14b toward covering 8. Barrier 30 surrounds an entire periphery of opening 28. Wall 14b has cutout 32 at a position corresponding to each of the side surface and the bottom surface of battery 12 to expose part of the side surface and bottom surface of battery 12. As described later, cooling unit 86 is thermally connected to one side surface of battery 12 through second heat transfer component 92, whereas first heat transfer component 84 is connected to the bottom surface of battery 12. In assembled battery module 1, wall 14b is positioned between restraint member 6 and battery 12. This configuration prevents restraint member 6 and battery 12 from coming into contact with each other.

Separator 14 has support 54 projecting toward covering 8 and supporting covering 8 in assembled battery module 1. Support 54 is disposed on wall 14b covering top surface n of battery 12. In the present exemplary embodiment, a pair of supports 54 is disposed at both ends of cutout 26. Supports 54, which face each other through cutout 26 and are arrayed in direction Y (a direction shown with arrow Y in FIG. 3) perpendicular to stacking direction X, put a bus bar into an installation position. The bus bar is disposed between the pair of supports 54.

As shown in FIG. 3, the plurality of batteries 12 and the plurality of separators 14 that are stacked together are put between the pair of end plates 4. The pair of end plates 4 is disposed such that the end plates are adjacent to outermost batteries 12 via respective separators 14 in stacking direction X of batteries 12. End plate 4 is made of a metal plate, for example, and is insulated from battery 12 by being adjacent to battery 12 via separator 14. A main surface of end plate 4 is provided with screw holes (not shown) into which fastening screws 16 are screwed.

The pair of restraint members 6 is arrayed in direction Y perpendicular to stacking direction X of batteries 12. An assemblage of the plurality of batteries 12, the plurality of separators 14, and the pair of end plates 4 is disposed between the pair of restraint members 6. Restraint member 6 has rectangular plane 6a parallel to a side surface of the assemblage and eaves part 6b protruding from an end of each side of plane 6a toward the assemblage. Restraint member 6 can be formed by folding each side of a rectangular metal plate, for example. Through holes (not shown) into which fastening screws 16 are inserted are provided at two eaves parts 6b facing each other in stacking direction X of batteries 12. Plane 6a is provided with opening 6d to expose the side surface of the assemblage. Preferably, opening 6d is disposed such that influence of the opening on rigidity of restraint member 6 against external force in stacking direction X of batteries 12 is reduced to a minimum or a low level. This configuration allows restraint member 6 to come down in weight while maintaining rigidity. Restraint member 6 may be provided with a plurality of openings as needed.

Battery stack 2 is assembled as follows, for example. In other words, first, the plurality of batteries 12 and the plurality of separators 14 are alternately arrayed, and are sandwiched by the pair of end plates 4. Accordingly, an assemblage is formed. Then, the pair of restraint members 6 is mounted on this assemblage. The assemblage partly enters a space surrounded by four eaves parts 6b of each restraint member 6. Each restraint member 6 is aligned such that the through holes of the member overlap screw holes of end plate 4. In this state, fastening screws 16 are inserted into the through holes and are screwed into the screw holes, respectively. As a result, the plurality of batteries 12 and the plurality of separators 14 are fastened by the pair of end plates 4 and the pair of restraint members 6.

The plurality of batteries 12 is positioned in stacking direction X of batteries 12 by being fastened in stacking direction X by restraint members 6. Further, the plurality of batteries 12 is positioned in a vertical direction by making the bottom surfaces of the batteries abut on lower eaves parts 6b of restraint members 6 via separators 14 and by making the top surfaces abut on upper eaves parts 6b of restraint members 6 via separators 14. In this state, the bus bars are electrically connected to output terminals 22 of batteries 12 and hence battery stack 2 is obtained.

As shown in FIGS. 1 and 2, covering 8 is also called a top cover and is disposed so as to cover a surface of battery stack 2 adjacent to output terminals 22 projecting from batteries 12. Covering 8 is a plate-shaped component that has a surface corresponding in geometry with a top surface of battery stack 2. In the present exemplary embodiment, covering 8 is rectangular in shape. Covering 8 prevents condensed water, dust, and other foreign matter from coming into contact with parts such as output terminals 22 of batteries 12, the bus bars, and valves 24. Covering 8 is a component that constitutes a part of an outer shell of battery module 1. Covering 8 is made of a resin having an insulation property, for example. Examples of the resin forming covering 8 include thermoplastic resins such as polypropylene (PP) and polybutylene terephthalate (PBT). Covering 8 can be fixed to the top surface of battery stack 2 by using a screw or a known fixing structure (not shown) including a locking mechanism. Covering 8 may be structurally designed so as to be fixed to battery stack 2 by clamping an upper part of separators 14 between both ends.

Seat 82 is a component on which battery stack 2 is placed. Seat 82 is, for example, a part of a container case for battery stack 2. Seat 82 is, for example, made from a metal such as iron or aluminum. Seat 82 has positioning mechanism 82a for first heat transfer component 84. Positioning mechanism 82a is disposed on a surface of seat 82 facing battery stack 2. Positioning mechanism 82a is, for example, a device such as print, a protrusion, or a recess for positioning. Positioning mechanism 82a may be a fixing structure, such as a threaded hole for a fastening screw, for fastening battery stack 2 to seat 82, for example.

First heat transfer component 84 is a member that is in contact with seat 82 and battery stack 2 to transfer heat from battery stack 2 to seat 82. First heat transfer component 84 is a sheet-shaped member having higher thermal conductivity than air. First heat transfer component 84 has an insulating property. First heat transfer component 84 is, for example, made from a resin such as polypropylene (PP) or an acrylic resin. One main surface of first heat transfer component 84 is in contact with the surface of seat 82 facing battery stack 2. The other main surface of first heat transfer component 84 is in contact with first surface 2a of battery stack 2 facing seat 82. In the present exemplary embodiment, first surface 2a is the bottom surface of battery stack 2.

Cooling unit 86 has a cooling mechanism to cool battery stack 2. Cooling unit 86 is thermally connected to second surface 2b of battery stack 2 through second heat transfer component 92. Second surface 2b extends in a direction intersecting with first surface 2a. In the present exemplary embodiment, second surface 2b is one side surface of battery stack 2. The side surface is a side surface extending in stacking direction X of batteries 12. As a result, side surfaces of batteries 12 incorporated in battery stack 2 are thermally connected to cooling unit 86. Second heat transfer component 92 is a sheet-shaped member having higher thermal conductivity than air. Second heat transfer component 92 has an insulating property and elasticity. When battery stack 2 is put into contact with cooling unit 86, second heat transfer component 92 is elastically deformed so as to fit a profile of second surface 2b of battery stack 2. Thus, second heat transfer component 92 interposed between cooling unit 86 and battery stack 2 contributes to an increased area of contact between cooling unit 86 and battery stack 2 and more efficient cooling of battery stack 2. Preferably, second heat transfer component 92 is in contact with entire second surface 2b.

The cooling mechanism of cooling unit 86 includes refrigerant tube 88 and cooling plate 90. Refrigerant tube 88 is a tube for circulating a refrigerant inside, extending along second surface 2b of battery stack 2. Cooling plate 90 is disposed between refrigerant tube 88 and battery stack 2. Refrigerant tube 88 is put into contact with one main surface of cooling plate 90. Second surface 2b of battery stack 2 is put into contact with the other main surface of cooling plate 90. The refrigerant circulating in refrigerant tube 88 cools battery stack 2 by exchanging heat with battery stack 2 through cooling plate 90.

Figure 6:
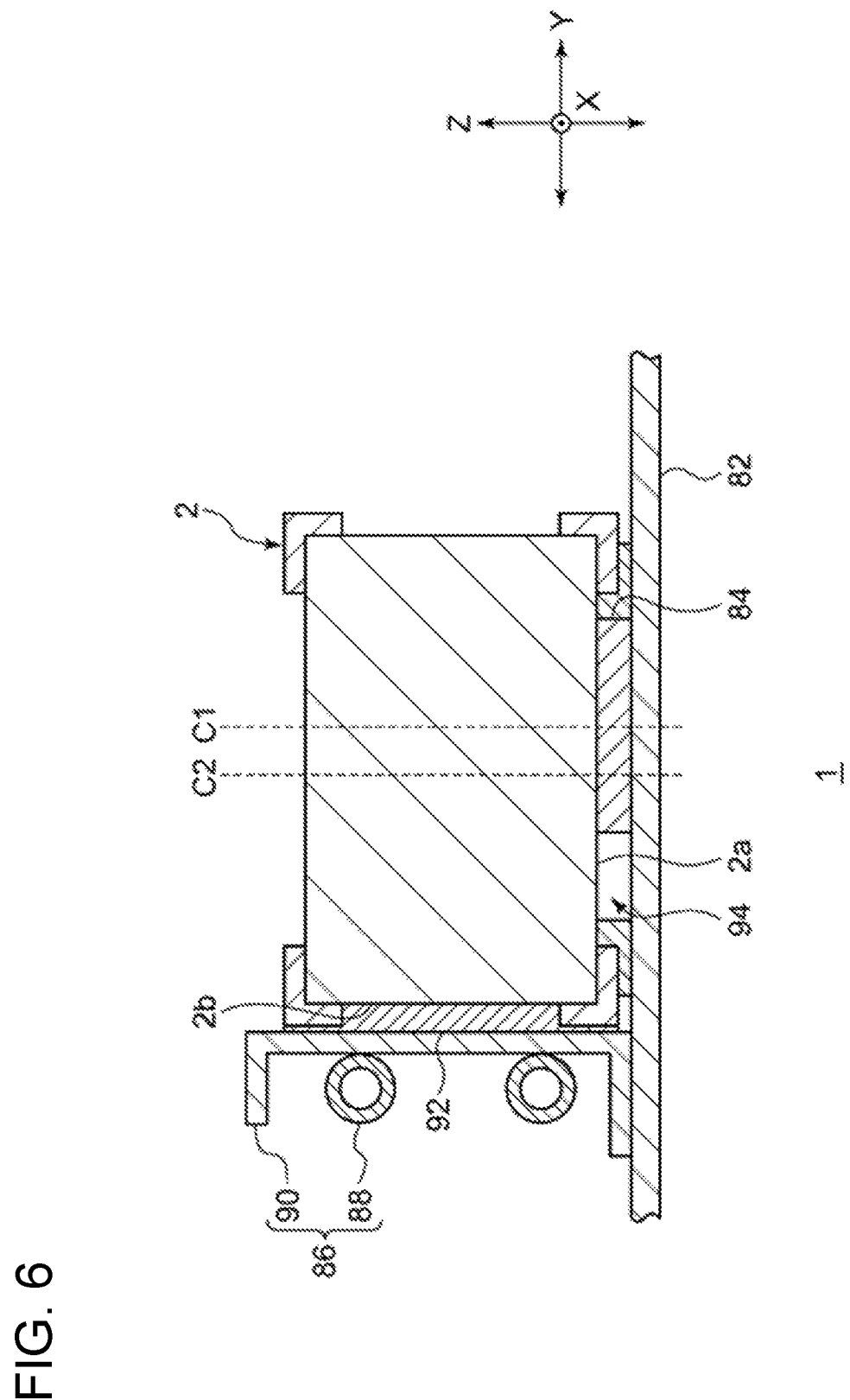
FIG. 6 is a schematic cross-sectional view illustrating the battery module according to the first exemplary embodiment.

A positional relationship among battery stack 2, first heat transfer component 84, and cooling unit 86 will now be described. FIG. 6 is a schematic cross-sectional view illustrating the battery module according to the first exemplary embodiment. FIG. 6 shows a cross section extending in direction Y perpendicular to stacking direction X of batteries 12. In FIG. 6, illustration of an internal structure of battery 12 is omitted. As shown in FIGS. 2 and 6, a positional relationship between first heat transfer component 84 and battery stack 2 is formed such that center C1 of first heat transfer component 84 is more away from cooling unit 86 than center C2 of battery stack 2 is in a direction along first surface 2a (an XY direction, or a direction along the surface of seat 82 on which first heat transfer component 84 is placed). Thus, center C1 of first heat transfer component 84 is at a more distant location from cooling plate 90 of cooling unit 86 than center C2 of battery stack 2 is as viewed along lamination direction Z of first heat transfer component 84 and battery stack 2 (a direction shown with arrow Z in FIGS. 2 and 6).

For example, center C1 of first heat transfer component 84 is a geometric barycenter (gravity center, or centroid) of a contour of first heat transfer component 84 projected on an XY-plane (or on the surface of seat 82 on which battery stack 2 and first heat transfer component 84 are placed). Similarly, center C2 of battery stack 2 is a geometric barycenter of a contour of battery stack 2 projected on the XY-plane. In the present exemplary embodiment, first heat transfer component 84 and battery stack 2 are each a rectangle in shape when viewed along lamination direction Z. Thus, centers C1, C2 are points of intersection of diagonal lines of the respective rectangles. Center C2 of battery stack 2 may be defined as described below. A position of center C2 in stacking direction X is a midpoint position between two main surfaces of two respective batteries 12 located at most external sides in stacking direction X. Center C2 in direction Y perpendicular to stacking direction X is a midpoint position between two side surfaces of battery 12.

Alternatively, the position of first heat transfer component 84 is determined with respect to battery stack 2 such that the first heat transfer component covers a larger part in a half region of battery stack 2 remote from cooling unit 86 than in a half region of battery stack 2 adjacent to cooling unit 86 as viewed along lamination direction Z.

Heat transfer suppressor 94 is disposed between seat 82 and first surface 2a of battery stack 2. Heat transfer suppressor 94 is situated adjacent to first heat transfer component 84. Preferably, heat transfer suppressor 94 is nearer to cooling unit 86 than first heat transfer component 84 is. Heat transfer suppressor 94 has lower thermal conductivity than first heat transfer component 84. In the present exemplary embodiment, heat transfer suppressor 94 is an air layer.

As described above, battery module 1 according to the present exemplary embodiment includes battery stack 2, seat 82 acting as a first heat radiator, first heat transfer component 84, and cooling unit 86 acting as a second heat radiator. First heat transfer component 84 is in contact with seat 82 and first surface 2a of battery stack 2 facing seat 82 to transfer heat from battery stack 2 to seat 82. Facing second surface 2b of battery stack 2 extending in the direction intersecting with first surface 2a, cooling unit 86 is thermally connected to battery stack 2 through second heat transfer component 92 to cool battery stack 2. The positional relationship between first heat transfer component 84 and battery stack 2 is formed such that center C1 of first heat transfer component 84 is more away from cooling unit 86 than center C2 of battery stack 2 is in a direction along first surface 2a.

In other words, in an extended region of battery stack 2, first heat transfer component 84 is shifted toward a side remote from cooling unit 86. This configuration facilitates radiation of heat from a part of battery stack 2 located away from cooling unit 86 as compared to another battery module without first heat transfer component 84. This contributes to the reduction of imbalance in temperatures across battery stack 2 owing to single-sided cooling and in turn reduces imbalance in temperatures of batteries 12. This configuration thus averts degradation in performance of battery module 1 due to an imbalance in temperatures of batteries 12. Because of the disposition of first heat transfer component 84 in a gap between battery stack 2 and seat 82, this configuration prevents upsizing of battery module 1 compared to another battery module including a plurality of cooling units 86. Consequently, the technique in the present exemplary embodiment enables the cooling of battery stack 2 more uniformly while avoiding upsizing of battery module 1.

Seat 82 has positioning mechanism 82a for first heat transfer component 84. This enables the cooling of battery stack 2 uniformly with improved reliability. This also enhances ease of assembly of battery module 1. Heat transfer suppressor 94 is interposed between seat 82 and first surface 2a so as to be situated adjacent to first heat transfer component 84. This enables the cooling of battery stack 2 uniformly with improved reliability.

Second Exemplary Embodiment

Figure 7:
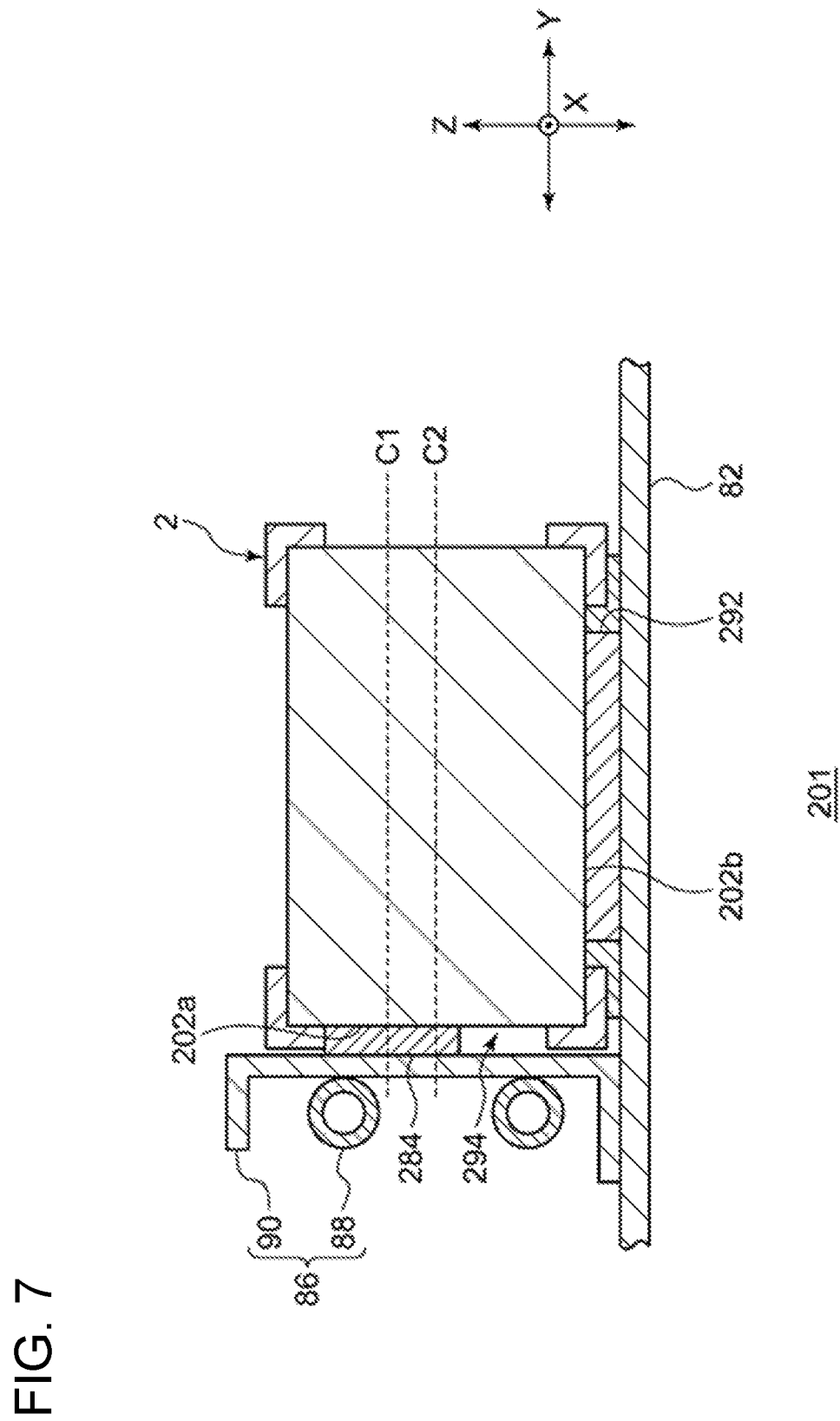
FIG. 7 is a schematic cross-sectional view illustrating a battery module according to a second exemplary embodiment.

A battery module according to the present exemplary embodiment shares a configuration with the battery module of the first exemplary embodiment except for a cooling unit acting as a first heat radiator and a seat acting as a second heat radiator. The following description of the battery module according to the present exemplary embodiment is primarily given on differences between the first and second exemplary embodiments, and redundant descriptions of shared elements are omitted or simplified. FIG. 7 is a schematic cross-sectional view illustrating the battery module according to the second exemplary embodiment. FIG. 7 shows a cross section extending in direction Y perpendicular to stacking direction X of batteries 12. In FIG. 7, illustration of the internal structure of battery 12 is omitted.

Battery module 201 according to the present exemplary embodiment includes cooling unit 86 acting as a first heat radiator, first heat transfer component 284, and seat 82 acting as a second heat radiator. First heat transfer component 284 is a member that is in contact with cooling unit 86 and battery stack 2 to transfer heat from battery stack 2 to cooling unit 86 and, in other words, is an intermediary member for heat exchange between battery stack 2 and cooling unit 86. First heat transfer component 284 is a sheet-shaped member having a physical property identical to that of first heat transfer component 84.

One main surface of first heat transfer component 284 is in contact with a surface of cooling unit 86 facing battery stack 2. The other main surface of first heat transfer component 284 is in contact with first surface 202a of battery stack 2 facing cooling unit 86. In the present exemplary embodiment, first surface 202a is one side surface of battery stack 2. The side surface is a side surface extending in stacking direction X of batteries 12. As a result, first heat transfer component 284 is in contact with side surfaces of batteries 12 incorporated in battery stack 2.

Seat 82 faces second surface 202b of battery stack 2 extending in a direction intersecting with first surface 202a and is thermally connected to second surface 202b through second heat transfer component 292. In the present exemplary embodiment, second surface 202b is a bottom surface of battery stack 2. Second heat transfer component 292 is a sheet-shaped member having a physical property identical to that of second heat transfer component 92.

A cooling mechanism of cooling unit 86 includes refrigerant tube 88 and cooling plate 90. Refrigerant tube 88 extends along first surface 202a of battery stack 2. Cooling plate 90 is disposed between refrigerant tube 88 and battery stack 2. Refrigerant tube 88 is in contact with one main surface of cooling plate 90. First heat transfer component 284 is in contact with the other main surface of cooling plate 90. A refrigerant circulating in refrigerant tube 88 cools battery stack 2 by exchanging heat with battery stack 2 through cooling plate 90 and first heat transfer component 284. Cooling unit 86 may be made of restraint member 6, with proviso that the cooling unit is capable of cooling batteries 12 incorporated in battery stack 2. In a battery module having this configuration, first heat transfer component 284 is disposed between restraint member 6 and the plurality of batteries 12.

A positional relationship between first heat transfer component 284 and battery stack 2 is formed such that center C1 of first heat transfer component 284 is more away from seat 82 than center C2 of battery stack 2 is in a direction along first surface 202a (an XZ direction, or a direction along the surfaces of cooling plate 90). Thus, center C1 of first heat transfer component 284 is at a more distant location from seat 82 than center C2 of battery stack 2 is as viewed along a direction in which first heat transfer component 284 and battery stack 2 are stacked (direction Y perpendicular to stacking direction X).

For example, center C1 of first heat transfer component 284 is a geometric barycenter of a contour of first heat transfer component 284 projected on an XZ-plane (or on any of the extended surfaces of cooling plate 90). Similarly, center C2 of battery stack 2 is a geometric barycenter of a contour of battery stack 2 projected on the XZ-plane. In the present exemplary embodiment, first heat transfer component 284 and battery stack 2 are each a rectangle in shape when viewed along direction Y perpendicular to stacking direction X. Thus, centers C1, C2 are points of intersection of diagonal lines of the respective rectangles. Center C2 of battery stack 2 may be defined as described below. A position of center C2 in stacking direction X is a midpoint position between two main surfaces of two respective batteries 12 located at most external sides in stacking direction X. Center C2 in stacking direction Z is a midpoint position between top surface n and the bottom surface of battery 12.

Alternatively, the position of first heat transfer component 284 is determined with respect to battery stack 2 such that the first heat transfer component covers a larger part in a half region of battery stack 2 remote from seat 82 than in a half region of battery stack 2 adjacent to seat 82 as viewed along direction Y perpendicular to stacking direction X.

Heat transfer suppressor 294 is disposed between cooling unit 86 and first surface 202a of battery stack 2. Heat transfer suppressor 294 is situated adjacent to first heat transfer component 284. Preferably, heat transfer suppressor 294 is nearer to seat 82 than first heat transfer component 284 is. Heat transfer suppressor 294 has lower thermal conductivity than first heat transfer component 284. In the present exemplary embodiment, heat transfer suppressor 294 is an air layer.

Battery module 201 according to the present exemplary embodiment can produce effects similar to those in the first exemplary embodiment. In other words, a region of battery stack 2 adjacent to seat 82 is more liable to radiate heat through seat 82 than a region of the battery stack remote from seat 82. To rectify this imbalance, the battery module has first heat transfer component 284 shifted toward a side remote from seat 82 and hence facilitates radiation of heat from the part of battery stack 2 located away from seat 82. This configuration enables the cooling of battery stack 2 more uniformly.

The present invention is not limited to the above-described exemplary embodiments. The exemplary embodiments can be combined, or further modification, such as various design changes, can be added thereto based on knowledge of the person of ordinary skill in the art. The combined or further modified exemplary embodiments are also included in the scope of the present invention. A new exemplary embodiment made by combining the above-described exemplary embodiments or adding modification thereto has effects of the combined or modified exemplary embodiments.

In the above-described exemplary embodiments, battery 12 is a prismatic battery. However, a shape of battery 12 is not particularly limited and may be cylindrical, for example. Further, a number of batteries 12 included in battery stack 2 is not particularly limited. Moreover, exterior can 18 may be covered with an insulating sheet, such as a shrink tube. An insulating sheet covering a surface of exterior can 18 can suppress a short circuit between adjacent batteries 12 or between battery 12 and end plate 4.

A structure of cooling unit 86 is not particularly limited. For example, the cooling unit may be a cooling plate having a channel inside to circulate a refrigerant, that is, a structure in which refrigerant tube 88 and cooling plate 90 are integrated. Such a cooling plate can be formed by extrusion molding or other techniques. Cooling unit 86 acting as a second heat radiator in the first exemplary embodiment and seat 82 acting as a second heat radiator in the second exemplary embodiment may bypass respective second heat transfer components 92, 292 and be put into direct contact with battery stack 2 so as to be thermally connected to battery stack 2.

A battery module may be provided with both first heat transfer component 84 of the first exemplary embodiment and first heat transfer component 284 of the second exemplary embodiment. In other words, first heat transfer component 84 may be disposed between seat 82 and battery stack 2 so as to be shifted toward a side remote from cooling unit 86, and first heat transfer component 284 may be disposed between cooling unit 86 and battery stack 2 so as to be shifted toward a side remote from seat 82. This structure is equivalent to a structure in the first exemplary embodiment in which second heat transfer component 92 is disposed between cooling unit 86 and battery stack 2 so as to be remote from seat 82 and function as first heat transfer component 284. This structure is also equivalent to a structure in the second exemplary embodiment in which second heat transfer component 292 is disposed between seat 82 and battery stack 2 so as to be remote from cooling unit 86 and function as first heat transfer component 84.

If a first surface of battery stack 2 is thermally connected to one of seat 82 and cooling unit 86 and if a second surface of battery stack 2 intersecting the first surface is thermally connected to the other of seat 82 and cooling unit 86, a corner where the first and the second surfaces meet is at a short distance away both from seat 82 and cooling unit 86. Thus, the corner is more liable to radiate heat than other parts remote from the corner. To rectify this imbalance, the battery module includes first heat transfer component 84 shifted toward a side remote from cooling unit 86 and first heat transfer component 284 shifted toward a side remote from seat 82 and hence facilitates radiation of heat from the parts of battery stack 2 located away from seat 82. This configuration enables the cooling of battery stack 2 more uniformly.

Any desired combinations of the above-described components and converted expressions of the present invention in methods, devices, systems, and other similar entities are still effective as aspects of the present invention.

The invention claimed is:

1. A battery module comprising:
 a battery stack including a plurality of stacked batteries and having a first surface and a second surface extending in a direction intersecting with the first surface;
 a first heat radiator facing the first surface of the battery stack;
 a first heat transfer component that is disposed between the first surface of the battery stack and the first heat radiator, and is in contact with the first heat radiator and the first surface to transfer heat from the battery stack to the first heat radiator; and
 a second heat radiator facing the second surface of the battery stack, and is thermally connected to the second surface directly or through a second heat transfer component, the second heat radiator being attached to the first, heat radiator,
 wherein a position of a center of the battery: stack projected on the first heat transfer component is located between a center of the first heat transfer component and the second heat radiator in a direction along the first surface.

2. The battery module according to claim 1, wherein the first heat radiator is one of a seat on which the battery stack is placed and a cooling unit having a cooling mechanism to cool the battery stack, and the second heat radiator is another of the seat and the cooling unit.

3. The battery module according to claim 1, wherein the first heat radiator includes a positioning mechanism for positioning the first heat transfer component.

4. The battery module according to claim 1, further comprising a heat transfer suppressor having lower thermal conductivity than the first heat transfer component and being interposed between the first heat radiator and the first surface so as to be situated adjacent to the first heat transfer component.

5. The battery module according to claim 4, wherein the heat transfer suppressor is an air layer.

6. The battery module according to claim 2, wherein the first heat radiator includes a positioning mechanism for positioning the first heat transfer component.

7. The battery module according to claim 1, further comprising a heat transfer suppressor having lower thermal conductivity than the first heat transfer component and being interposed between the first heat radiator and the first surface so as to be situated adjacent to the first heat transfer component.

8. The battery module according to claim 3, further comprising a heat transfer suppressor having lower thermal conductivity than the first heat transfer component and being interposed between the first heat radiator and the first surface so as to be situated adjacent to the first heat transfer component.

9. The battery module according to claim 6, further comprising a heat transfer suppressor having lower thermal conductivity than the first heat transfer component and being interposed between the first heat radiator and the first surface so as to be situated adjacent to the first heat transfer component.

10. The battery module according to claim 7, wherein the heat transfer suppressor is an air layer.

11. The battery module according to claim 8, wherein the heat transfer suppressor is an air layer.

12. The battery module according to claim 9, wherein the heat transfer suppressor is an air layer.

13. The battery module according to claim 1, wherein the first surface is perpendicular to the second surface.

14. The battery module according to claim 3, wherein the positioning mechanism includes at least one selected from the group consisting of a printed mark, a protrusion, a recess, and a threaded hole for a fastening screw.

15. The battery module according to claim 6, wherein the positioning mechanism includes at least one selected from the group consisting of a printed mark, a protrusion, a recess, and a threaded hole for a fastening screw.

16. A battery module comprising:
 a battery stack including a plurality of stacked batteries and having a first surface and a second surface extending in a direction intersecting with the first surface;
 a first heat radiator facing the first surface of the battery stack;
 a first heat transfer component that contacts with the first surface of the battery stack is in contact with the first heat radiator and the first surface to transfer heat from the battery stack to the first heat radiator; and
 a second heat radiator contacting with the second surface of the battery stack, and is thermally connected to the second surface directly or through a second heat transfer component, the second heat radiator being attached to the first heat radiator,
 wherein a position of a center of the battery stack projected on the first heat transfer component is located between a center of the first heat transfer component and the second heat radiator in a direction along the first surface.

* * * * *